United States Patent
Arges et al.

(10) Patent No.: US 8,788,763 B2
(45) Date of Patent: *Jul. 22, 2014

(54) PROTECTING MEMORY OF A VIRTUAL GUEST

(75) Inventors: Christopher J. Arges, Austin, TX (US); Nathan D. Fontenot, Georgetown, TX (US); Ryan P. Grimm, Austin, TX (US); Joel H. Schopp, Austin, TX (US); Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/482,782

(22) Filed: May 29, 2012

(65) Prior Publication Data

US 2013/0097392 A1   Apr. 18, 2013

Related U.S. Application Data

(63) Continuation of application No. 13/272,780, filed on Oct. 13, 2011.

(51) Int. Cl.
| | |
|---|---|
| *G06F 12/14* | (2006.01) |
| *G06F 21/00* | (2013.01) |
| *G06F 9/455* | (2006.01) |
| *G06F 9/46* | (2006.01) |
| *G06F 21/53* | (2013.01) |
| *G06F 21/62* | (2013.01) |

(52) U.S. Cl.
CPC ........ *G06F 9/45533* (2013.01); *G06F 9/45558* (2013.01); *G06F 9/468* (2013.01); *G06F 12/14* (2013.01); *G06F 12/1458* (2013.01); *G06F 12/1491* (2013.01); *G06F 21/53* (2013.01); *G06F 21/62* (2013.01); *G06F 21/6209* (2013.01); *G06F 21/6281* (2013.01); *G06F 2009/45583* (2013.01); *G06F 2212/151* (2013.01)
USPC ............... 711/152; 711/6; 711/147; 711/163; 711/E12.001; 711/E12.091; 718/1; 726/27

(58) Field of Classification Search
None
See application file for complete search history.

(56) References Cited

U.S. PATENT DOCUMENTS 6,496,847 B1 * 12/2002 Bugnion et al. .................. 718/1
6,944,699 B1 *  9/2005 Bugnion et al. ............... 710/269

(Continued)

FOREIGN PATENT DOCUMENTS

JP     2007510198 A    4/2007
JP     2011076505 A    4/2011

(Continued)

OTHER PUBLICATIONS

Tomohisa Egawa, Preventing Information Leakage to Privilege VM Regarding Keyboard Input, IPSJ SIG Technical Reports 2011, [CD-ROM], Aug. 15, 2011, No. 118, p. 1-8.

(Continued)

*Primary Examiner* — Kevin Verbrugge
(74) *Attorney, Agent, or Firm* — Kunzler Law Group

(57) ABSTRACT

An apparatus and system for protecting memory of a virtual guest includes initializing a virtual guest on a host computing system. The host computing system includes a virtual machine manager that manages operation of the virtual guest. The virtual guest includes a distinct operating environment executing in a virtual operation platform provided by the virtual machine manager. The method includes receiving an allocation of run-time memory for the virtual guest, the allocation of run-time memory comprising a portion of run-time memory of the host computing system. The method includes setting, by the virtual guest, at least a portion of the allocation of run-time memory to be inaccessible by the virtual machine manager.

9 Claims, 9 Drawing Sheets

(56) References Cited

U.S. PATENT DOCUMENTS

| | | | |
|---|---|---|---|
| 7,103,529 B2* | 9/2006 | Zimmer | 703/27 |
| 7,506,122 B1 | 3/2009 | Agesen et al. | |
| 7,665,088 B1* | 2/2010 | Bugnion et al. | 718/1 |
| 7,748,037 B2* | 6/2010 | Rajagopal et al. | 726/23 |
| 7,886,126 B2 | 2/2011 | Bennett et al. | |
| 7,908,646 B1 | 3/2011 | Chen et al. | |
| 8,079,034 B2* | 12/2011 | Bennett et al. | 718/104 |
| 8,380,987 B2* | 2/2013 | Traut et al. | 713/166 |
| 8,561,068 B2* | 10/2013 | Bennett et al. | 718/1 |
| 2004/0205203 A1 | 10/2004 | Peinado et al. | |
| 2005/0060702 A1* | 3/2005 | Bennett et al. | 718/1 |
| 2006/0294519 A1 | 12/2006 | Hattori et al. | |
| 2007/0067590 A1* | 3/2007 | Savagaonkar et al. | 711/163 |
| 2007/0079090 A1* | 4/2007 | Rajagopal et al. | 711/163 |
| 2008/0184373 A1* | 7/2008 | Traut et al. | 726/26 |
| 2009/0037909 A1 | 2/2009 | Xu | |
| 2009/0187729 A1 | 7/2009 | Serebrin et al. | |
| 2009/0219935 A1 | 9/2009 | Tripathi et al. | |
| 2010/0058432 A1 | 3/2010 | Neystadt et al. | |
| 2010/0132011 A1 | 5/2010 | Morris et al. | |
| 2010/0333090 A1 | 12/2010 | Wright et al. | |
| 2011/0225459 A1 | 9/2011 | Fahrig et al. | |
| 2012/0079481 A1* | 3/2012 | Bennett et al. | 718/1 |

FOREIGN PATENT DOCUMENTS

| | | |
|---|---|---|
| WO | 2011040192 A1 | 4/2011 |
| WO | 2011081935 A2 | 7/2011 |

OTHER PUBLICATIONS

PCT/JP2012/006528, Written Opinion, Jan. 29, 2013.
PCT/2012/006528, International Search Report, Jan. 29, 2013.
IBM et al.; "Application Protection Inside An Untrusted OS", IPCOM000193066D, Feb. 9, 2010.
Azab et al.; "HIMA: A Hypervisor-Based Integrity Measurement Agent", ACSAC Annual, Dec. 7-11, 2009, pp. 461-470.
Li et al.; "Secure Virtual Machine Execution Under an Untrusted Management OS", CLOUD IEEE 3rd Inter. Conf. on, Jul. 5-10, 2010, pp. 172-179.
Rhee et al.; "Defeating Dynamic Data Kernel Rootkit Attacks Via VMM-Based Guest-Transparent Monitoring", Ares Inter. Conf. on, Mar. 16-19, 2009, pp. 74-81.

* cited by examiner

PROTECTING MEMORY OF A VIRTUAL GUEST

CROSS-REFERENCE TO RELATED APPLICATIONS

This is a continuation application of and claims priority to U.S. patent application Ser. No. 13/272,780 entitled "PROTECTING MEMORY OF A VIRTUAL GUEST" and filed on Oct. 13, 2011 for Christopher J. Arges, et al., which is incorporated herein by reference.

BACKGROUND

1. Field

The subject matter disclosed herein relates to virtualization and virtual guests and more particularly relates to protecting memory of a virtual guest.

2. Description of the Related Art

Hardware virtualization enables the abstraction of a computing platform that includes simulating one or more computer environments in which applications, programs, and even complete operating systems may execute as "virtual guests" of the host computing platform. Typically, an application on the host, such as a hypervisor or virtual machine manager, manages and/or provides these virtual computer environments.

Currently with virtualization, virtual guests are typically vulnerable to a compromised host (e.g. the hypervisor or virtual machine manager). Furthermore, when a virtual guest is operating in a cloud computing environment, the virtual guest must trust the cloud provider to secure its hosts and not abuse its access. As a result, many virtual guests, such as those hosting confidential research or other sensitive data, would not be able to run in a public cloud computing environment because the host could potentially access the virtual guest's confidential data.

BRIEF SUMMARY

A method for protecting virtual guest memory is provided. The method includes initializing a virtual guest on a host computing system. The host computing system includes a virtual machine manager that manages operation of the virtual guest. The virtual guest includes a distinct operating environment executing in a virtual operation platform provided by the virtual machine manager. The method includes receiving an allocation of run-time memory for the virtual guest. The allocation of run-time memory includes a portion of run-time memory of the host computing system. The method includes setting, by the virtual guest, at least a portion of the allocation of run-time memory to be inaccessible by the virtual machine manager.

An apparatus for protecting virtual guest memory is provided with a plurality of modules configured to functionally execute the steps described above with regard to the presented method. These modules, in the described embodiments, include an initialization module, a receiving module, and a protection module. The initialization module initializes a virtual guest on a host computing system. The host computing system includes a virtual machine manager that manages operation of the virtual guest. The virtual guest includes a distinct operating environment executing in a virtual operation platform provided by the virtual machine manager. The receiving module receives an allocation of run-time memory for the virtual guest. The allocation of run-time memory includes a portion of run-time memory of the host computing system. The protection module sets, by the virtual guest, at least a portion of the allocation of run-time memory to be inaccessible by the virtual machine manager.

A system is presented for protecting virtual guest memory. The system includes a virtual machine manager that provides a virtual operation platform for a host computing system, a processor, and a memory storing modules for execution by the processor. The memory includes an initialization module that initializes a virtual guest on a host computing system. The host computing system includes a virtual machine manager that manages operation of the virtual guest. The virtual guest includes a distinct operating environment executing in a virtual operation platform provided by the virtual machine manager. The receiving module receives an allocation of run-time memory for the virtual guest. The allocation of run-time memory includes a portion of run-time memory of the host computing system. The protection module sets, by the virtual guest, at least a portion of the allocation of run-time memory to be inaccessible by the virtual machine manager.

A computer program product is presented for protecting virtual guest memory. The computer program product includes a computer readable storage medium having computer readable program code embodied therewith. The computer readable program code is for initializing a virtual guest on a host computing system. The host computing system includes a virtual machine manager that manages operation of the virtual guest. The virtual guest includes a distinct operating environment executing in a virtual operation platform provided by the virtual machine manager. The computer readable program code is for receiving an allocation of run-time memory for the virtual guest. The allocation of run-time memory includes a portion of run-time memory of the host computing system. The computer readable program code is for setting, by the virtual guest, at least a portion of the allocation of run-time memory to be inaccessible by the virtual machine manager.

Another method is presented. The method includes deploying a virtual guest security apparatus onto a host computing system. The virtual guest security apparatus is capable of initializing a virtual guest on a host computing system. The host computing system includes a virtual machine manager that manages operation of the virtual guest. The virtual guest includes a distinct operating environment executing in a virtual operation platform provided by the virtual machine manager. The virtual guest security apparatus is capable of receiving an allocation of run-time memory for the virtual guest. The allocation of run-time memory includes a portion of run-time memory of the host computing system. The virtual guest security apparatus is capable of setting, by the virtual guest, at least a portion of the allocation of run-time memory to be inaccessible by the virtual machine manager.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
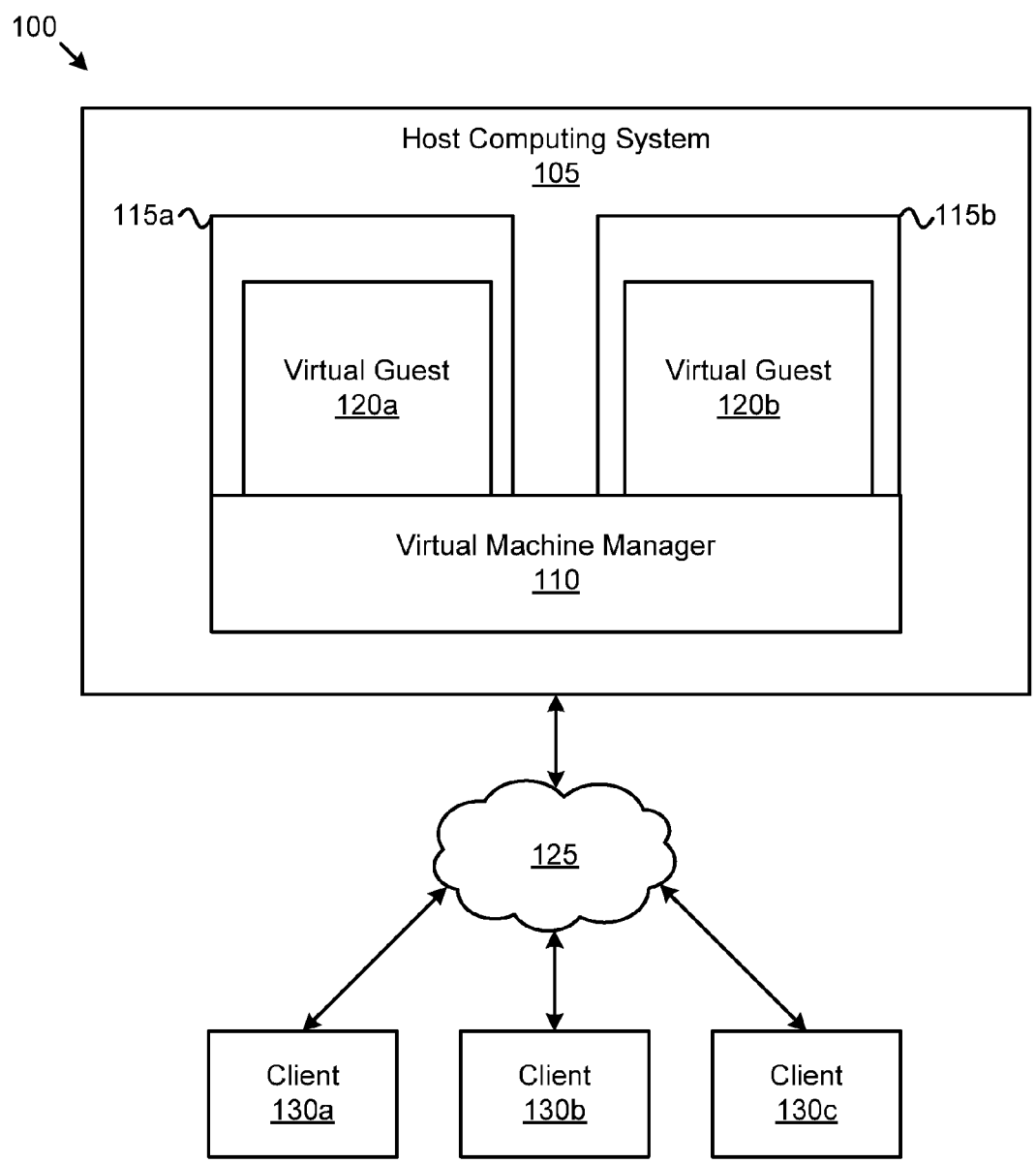
FIG. 1 is a schematic block diagram illustrating one embodiment of a system for protecting virtual guest memory in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for protecting virtual guest memory. In the depicted embodiment, the system 100 includes a host computing system 105 with a virtual machine manager 110 providing a plurality of virtual machines 115a, 115b for a plurality of virtual guests 120a, 120b. The host computing system 105 is in communication with one or more clients 130a, 130b, 130c, through a network 125.

The host computing system 105 may be embodied by a server computer, a desktop computer, a laptop computer, a tablet computer, a mobile device, a set top box, or another device. In one embodiment, the host computing system 105 provides and/or operates in association with additional computing systems to provide a cloud computing platform to host, store, and/or provide applications, documents, and data for on-demand access over the network 125 by the clients 130a, 130b, 130c. A client 130a may communicate and interact with a virtual guest 120a through the network 125. For example, a virtual guest operating system 120a may reside on a cloud computing server. The virtual guest operating system 120a may execute a word processing application on which a user, through a client, may access a word processing document.

The host computing system 105 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the host computing system 105. The storage may include a Solid State Drive ("SSD"), a hard disk drive ("HDD"), an optical storage device, a holographic storage device, a micromechanical storage device, or other non-volatile data storage device.

The network 125 may comprise a communications network such as the Internet, a Local Area Network ("LAN"), a Wireless LAN ("WLAN"), multiple LANs communicating over the Internet, or any other similar communications network. Each client 130a, 130b, 130c communicates with the host computing system 105 through the network 125. In one embodiment, a client 130a may be embodied as a desktop computer, a portable computer, a server, a mainframe computer, a handheld computing device, a touch device, a PDA, a tablet computer, an e-Book reader, a mobile phone, a Smartphone, and the like.

The virtual machine manager 110, also known as a hypervisor or virtual machine monitor, presents a virtual machine 115a, or virtual operating platform, for a virtual guest 120a to operate in. As is known in the art, a virtual machine 115a abstracts actual hardware characteristics of the host computing system 105, providing a virtual representation of computing resources for use by a virtual guest 120. The virtual guest 120a executes in the virtual machine 115a as if it were running directly on the host computing system 105 except that the virtual machine manager 110 manages execution of the virtual guest 120a and may restrict access to various system resources. The virtual machine manager 110 may provide a portion of resources of the underlying host computing system 105 to each virtual guest 120a, 120b such as a subset of host computing system 105 instruction set of the underlying machine, kernel calls, hardware registers, and the like.

In the depicted embodiment, the virtual machine manager 110 includes two virtual machines 115a, 115b, each with a virtual guest 120a, 120b. However, any suitable number of virtual machines 115a, 115b and virtual guests 120a, 120b may be used. Each virtual guest 120a, 120b may be an application or program. In one embodiment, a virtual guest 120a is an operating system. A virtual guest operating system 120a may assume that it is communicating directly with hardware of the host computing system 105. For example, a virtual guest operating system 120a may maintain a page table that stores a mapping between physical addresses on memory and logical addresses received by a processor from a client such as an application. The virtual guest operating system 120a may assume that the physical addresses in its page table are actual physical addresses on memory and that the virtual guest operating system 120a actually communicates with the processor and other hardware data structures of the host computing system 105. However, instead of the processor, the virtual guest operating system 120a may actually be communicating with the virtual machine manager 110 and the supposed physical addresses are treated as virtual addresses by the virtual machine manager 110, which performs another layer of mapping to map each supposed physical address to an actual physical address of the host computing system memory.

Figure 2:
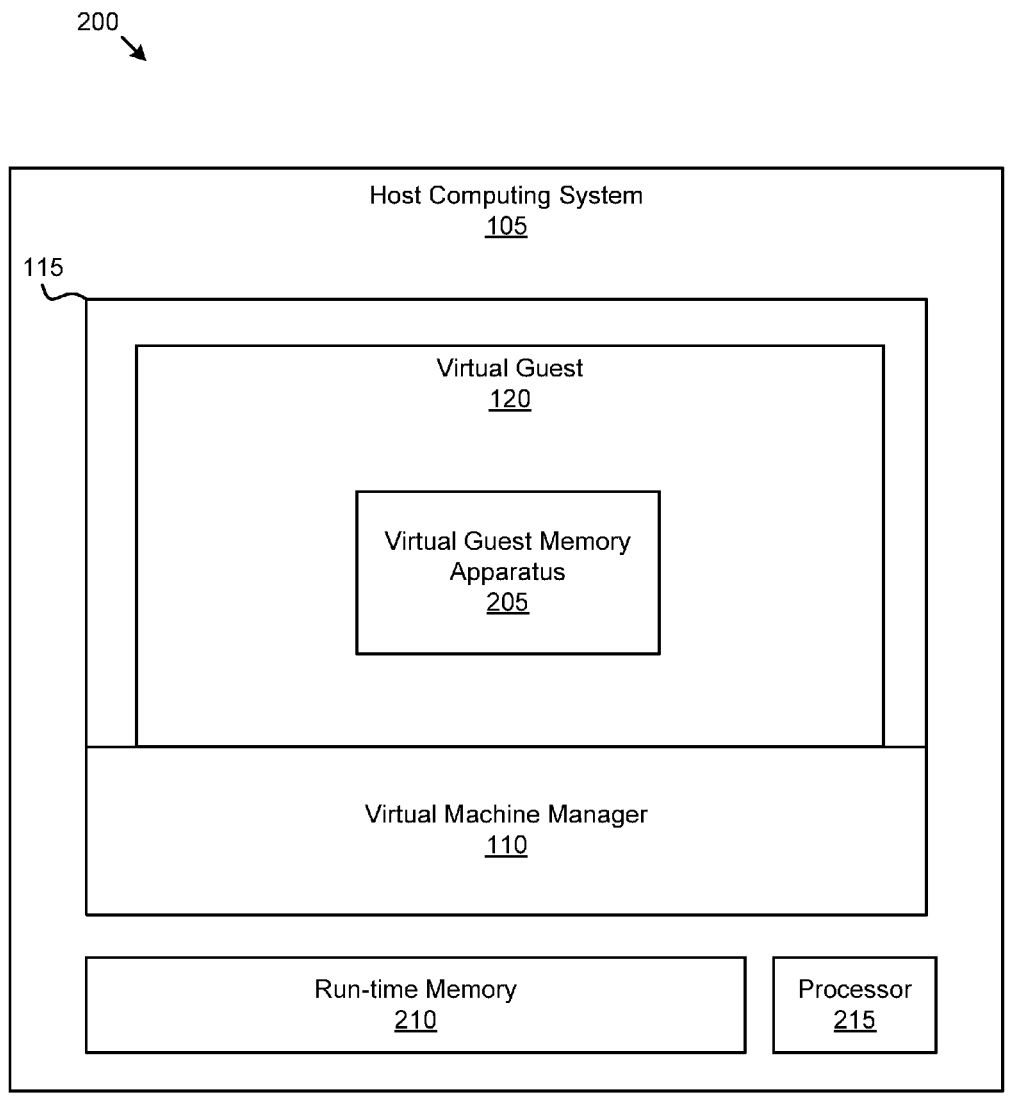
FIG. 2 is a schematic block diagram illustrating a second embodiment of a system for protecting virtual guest memory in accordance with the present invention.

FIG. 2 is a schematic block diagram illustrating another embodiment of a system 200 for protecting virtual guest memory. Specifically, FIG. 2 depicts one embodiment of the host computing system 105, virtual machine manager 110, a virtual machine 115, and a virtual guest 120 of FIG. 1. The virtual guest 120 includes a virtual guest memory apparatus 205 and the host computing system 105 includes run-time memory 210 and a processor 215.

Conventional virtual machine managers 110 manage processor resources, I/O resources, and run-time memory 210 for virtual guests 120 running on the host computing system 105, including memory allocation to each virtual guest 120 of a portion of run-time memory 210 of the host computing system 105. A convention virtual machine manager 110 may access run-time memory 210 of conventional virtual guests. As a result, a conventional virtual guest executing on a conventional virtual machine manager 110 has no control over the virtual machine manager's 110 access of run-time memory 210 for the virtual guest. Furthermore, a user has no assurance that the conventional virtual machine manager 110 will not attempt to access run-time memory 210 or will not be comprised by an attacker seeking to access the run-time memory 210. Consequently, applications with sensitive data are often not hosted on unverifiable host computing systems 105, such as public cloud computing systems. The hosting opportunities for these sensitive applications become limited.

Therefore, the virtual guest memory apparatus 205 protects run-time memory 210 of a virtual guest 120 from the host computing system 105/virtual machine manager 110. Specifically, the virtual guest memory apparatus 205 allows a virtual guest 120 to protect its run-time memory 210 by setting its run-time memory 210 as inaccessible by the virtual machine manager 110. In one embodiment, the virtual guest memory apparatus 205 enables the virtual guest 120 to share a portion of its run-time memory 210 with the virtual machine manager 110. For example, the virtual machine manager 110 may set portions of its run-time memory 210 to be accessible for reads and/or writes by the host or other guests. This would allow some run-time memory 210 to be used for networking and other I/O, but still leave most of the virtual guest memory completely private. As a result, a user may have an assurance that applications and data hosted on a particular host computing system 105 are safe, greatly expanding the number of available hosts when data security is a concern.

Furthermore, the virtual guest memory apparatus 205 may protect the virtual guest 120 from various situations in which a host computing system 105 or virtual machine manager 110 is compromised. For example, if the virtual machine manager 110 is compromised by malicious software or a hacker while the virtual guest 120 is executing, the virtual machine manager 110 cannot access the virtual guest memory and therefore cannot compromise any data.

In one embodiment, the virtual guest memory apparatus 205 works with conventional virtual machine managers 110. In other embodiments, the virtual machine manager 110 may be configured to request additional access of the virtual guest run-time memory 210 for specific situations such as for memory dump data or virtual guest migration (e.g. copying a virtual guest 120 to another computing system). For example, if an application crashes on the virtual guest 120, the virtual machine manager 110 may request additional access to obtain the memory dump data related to the application crash. The virtual guest memory apparatus 205 may grant additional requests that meet predetermined criteria and, in certain embodiments, take actions to protect sensitive data before access is allowed.

Figure 3:
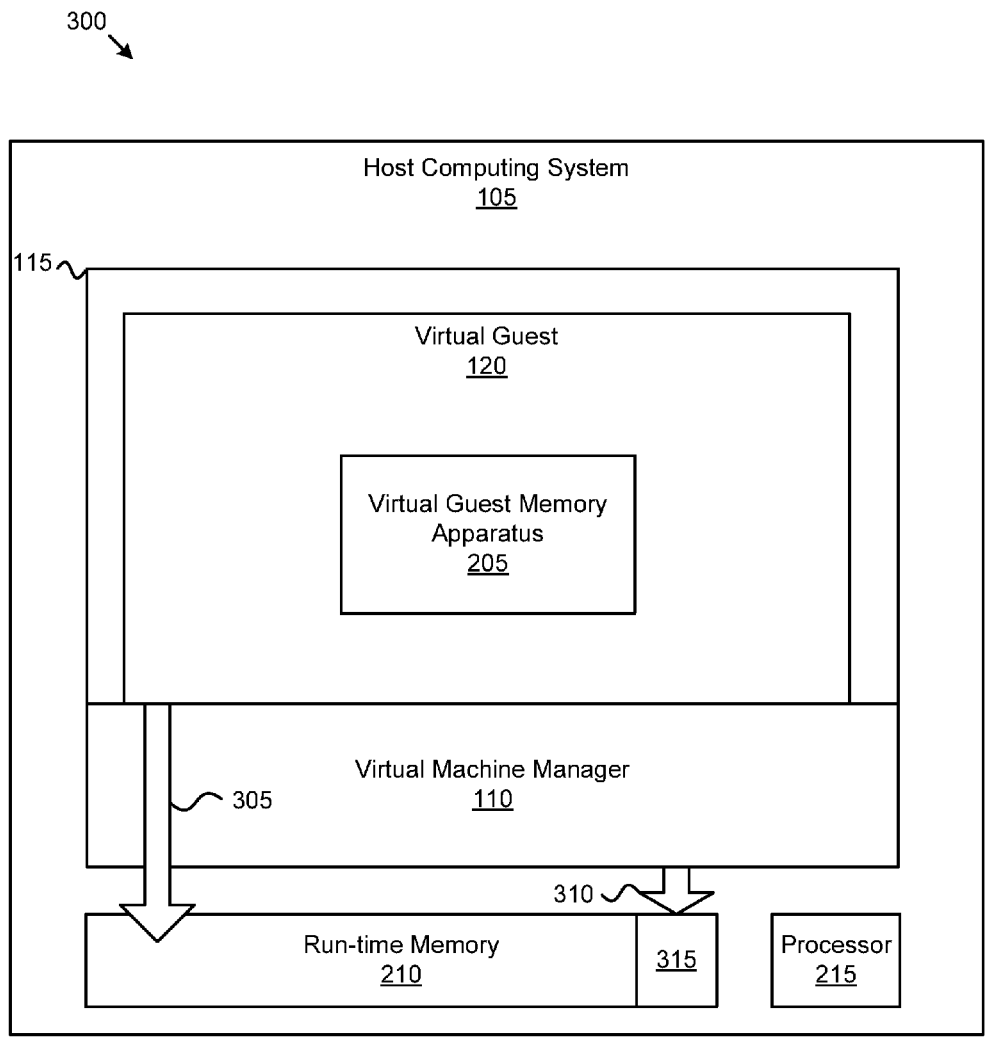
FIG. 3 is a schematic block diagram illustrating a third embodiment of a system for protecting virtual guest memory in accordance with the present invention.

In one embodiment, the virtual guest memory apparatus 205 verifies that it communicates directly with the processor 215 (e.g. the processor 215 and other processor-related structures such as the translation lookaside buffer "TLB") of the host computing system 105. Referring to FIG. 3, in one embodiment, the virtual guest memory apparatus 205 enables the virtual guest 120 to set access permissions of its run-time memory 210 directly 305 through the processor 215 and independent of the virtual machine manager 110. Similarly, in one embodiment, the virtual guest memory apparatus 205 enables the virtual guest 120, by communicating directly with the processor 215, to set up a shared memory portion 315 of run-time memory 210 for the virtual machine manager 110 to access 310.

Referring back to FIG. 2, in the depicted embodiment, the virtual guest memory apparatus 205 executes in, is in communication with, and/or is part of the virtual guest 120. For example, the virtual guest memory apparatus 205 may include executable code run during execution of the virtual guest 120. In some embodiments, a portion of the virtual guest memory apparatus 205 may be part of the virtual machine manager 110. For example, both the virtual guest 120 and the virtual machine manager 110 may each include portions of the virtual guest memory apparatus 205. In one embodiment, a portion of the virtual guest memory apparatus 205 is part of and/or in communication with the processor 215 and/or related hardware components of the host computing system 105. For example, the processor 215, as described below, may include a portion of the virtual guest memory apparatus 205 (e.g. such as on firmware in communication with the processor 215) to associate run-time memory 210 with certain virtual guests 120 and prevent requests from other entities from accessing the run-time memory 210.

Figure 4:
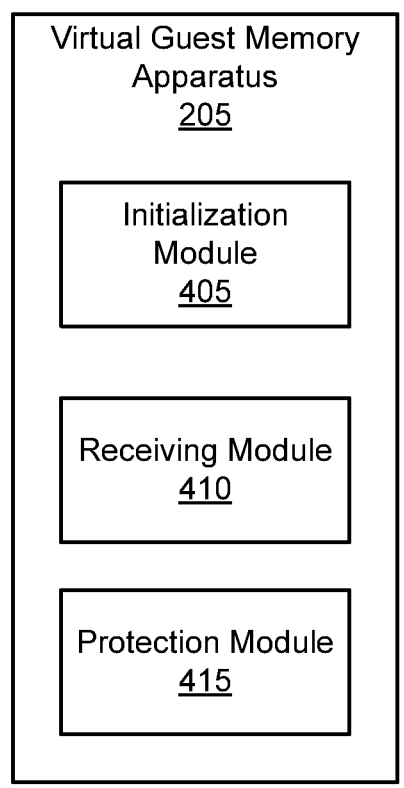
FIG. 4 is a schematic block diagram illustrating one embodiment of an apparatus for protecting virtual guest memory in accordance with the present invention.

FIG. 4 is a schematic block diagram illustrating one embodiment of an apparatus 205 for protecting virtual guest memory. The apparatus 205 is one embodiment of the virtual guest memory apparatus 205 of FIGS. 2-3 and includes one or more of an initialization module 405, a receiving module 410, and a protection module 415.

The initialization module 405, in one embodiment, initializes a virtual guest 120 on a host computing system 105. The host computing system 105 comprising a virtual machine manager 110 as described above in relation to FIGS. 1-3. The initialization module 405 may initialize the virtual guest 120 by executing code in the virtual guest 120 to boot the virtual guest 120. For example, the host computing system 105 may boot the virtual machine manager 110 which signals the initialization module 405 to initialize the virtual guest 120.

The receiving module 410, in one embodiment, receives an allocation of run-time memory 210 for the virtual guest 120. The allocation of run-time memory 210 includes a portion of run-time memory 210 of the host computing system 105. For example, once the virtual machine manager 110 is booted and the initialization module 405 has initialized the virtual guest 120, the receiving module 410 may receive a portion of run-time memory 210 that the virtual guest 120 may use during execution. In one embodiment, the virtual machine manager 110 allocates the allocation of run-time memory 210 for the virtual guest 120. For example, the virtual machine manager 110 may determine that the virtual guest 120 will be allocated a certain portion of run-time memory 210 and the virtual machine manager 110 may make the allocation available to the virtual guest 120. The receiving module 410 may detect the allocation of run-time memory 210 as available for use.

The protection module 415 sets, by the virtual guest 120, at least a portion of the allocation of run-time memory 210 to be inaccessible by the virtual machine manager 110. For example, in one embodiment, the protection module 415 is part of and/or in communication with the virtual guest 120 and allows the virtual guest 120 to set access permissions for its run-time memory 210 allocation. Therefore, in one embodiment, access to the allocation of run-time memory 210 is determined by the virtual guest 120. In one embodiment, the protection module 415 setting, by the virtual guest 120, at least the portion of the allocation of run-time memory 210 to be inaccessible by the virtual machine manager 110 further comprises communicating, by the virtual guest 120, directly with the processor 215, independent of the virtual machine manager 110, to set access permissions for the allocation of run-time memory 210 of the virtual guest 120. In one embodiment, the protection module 415 may set various levels of access permission for its allocation of run-time memory 210. For example, the protection module 415 may set read-only access, read/write access, and the like for certain virtual guests 120 and/or the virtual machine manager 110.

The protection module 415, in one embodiment, communicates directly with the processor 215 to set access permissions for its allocation of memory. As used herein, communicating with the processor 215 may refer to communicating with software or firmware in communication with the processor 215 and/or other hardware components of the host computing system 105 related to run-time memory 210 management. In one embodiment, the protection module 415 issues predetermined commands to the processor 215 to set access permission for a particular portion of run-time memory 210. The particular portion may be designated by an address range of data pages in memory, although any suitable unit of memory may be used. As is known in the art, a data page is a unit of main memory used for virtual memory addressing. A data page may comprise the smallest unit of data for memory allocation performed by the operating system for swapping application data between main memory and secondary storage. The protection module 415 may call a command to designate a particular range of data pages as protected.

In one embodiment, the protection module 415 further establishes a shared memory portion of the allocation of run-time memory 210 of the virtual guest 120 for access by the virtual machine manager 110. The protection module 415, in one embodiment, may also communicate directly with the processor 215 to establish the shared memory portion. For example, the protection module 415 may call a predetermined command to share a certain data page range with a certain entity, such as the virtual machine manager 110 and/or other virtual guests 120. The protection module 415 may designate the shared memory portion for non-sensitive data, such as for networking data and other I/O data that may be needed for interaction with the virtual machine manager 110.

In one embodiment, as described below, the processor 215 may enforce permissions set by the virtual guest 120, by way of a Virtual Process Identifier ("VPID") in the case of certain Intel® processors, or similar identifier that uniquely identifies a data page of run-time memory 210 as being associated with a particular virtual guest 120. Entries in page tables and extended page tables (additional page tables supported by certain processor implementations to optimize virtualization) include a VPID to identify the virtual guest 120 to which the entry belongs. In addition, the virtual machine manager 110 also typically has its own unique VPID.

Figure 5:
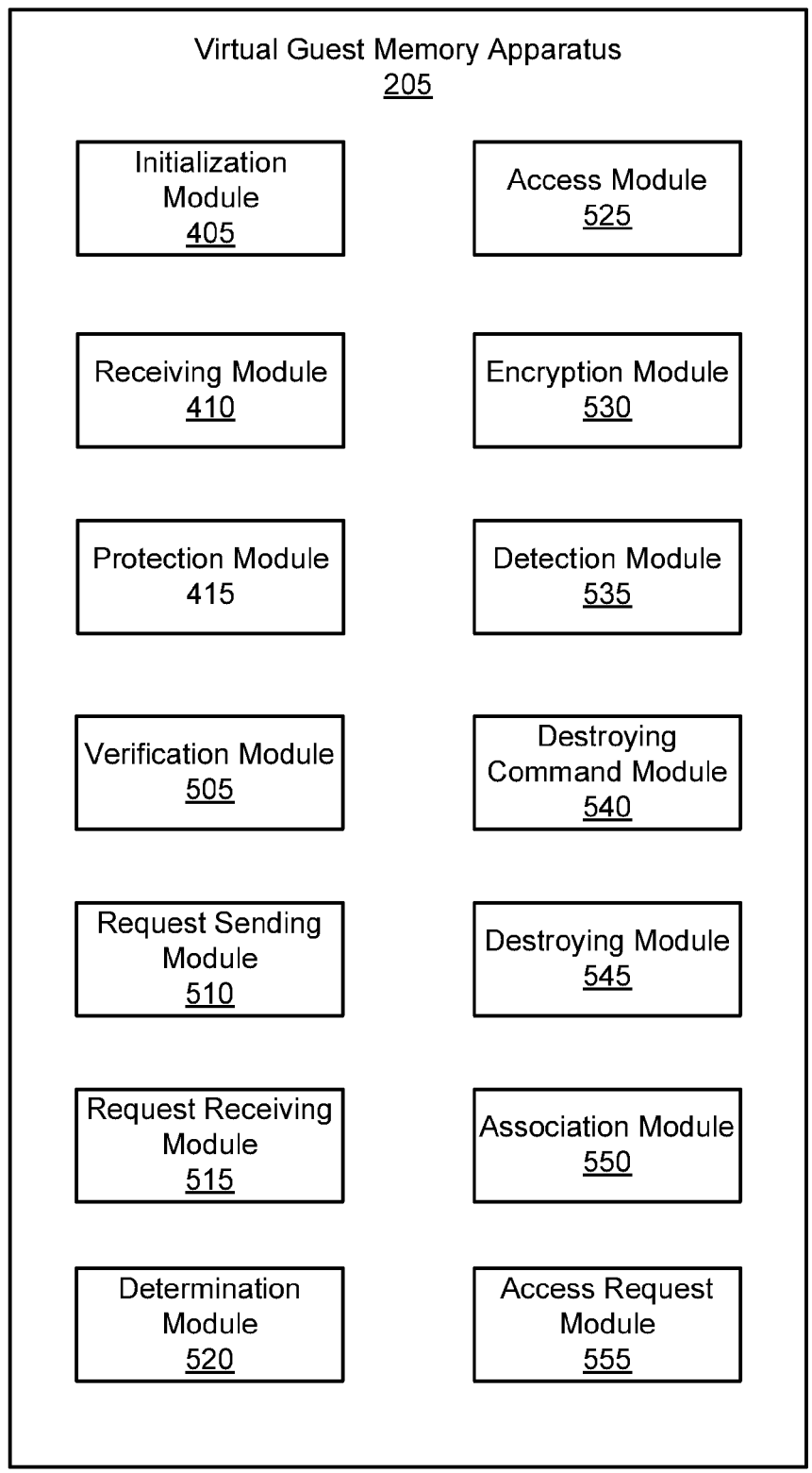
FIG. 5 is a detailed schematic block diagram illustrating another embodiment of an apparatus for protecting virtual guest memory in accordance with the present invention.

FIG. 5 is a detailed schematic block diagram illustrating another embodiment of an apparatus 205 for protecting virtual guest memory. In the depicted embodiment, the virtual guest memory apparatus 205 includes the initialization module 405, the receiving module 410, and the protection module 415, which are substantially similar to those described in relation to FIG. 4. In the embodiment, the virtual guest memory apparatus 205 further includes one or more of a verification module 505, a request sending module 510, a request receiving module 515, a determination module 520, an access module 525, an encryption module 530, a detection module 535, a destroying command module 540, a destroying module 545, an association module 550, and an access request module 555, which are described below.

The verification module 505, in one embodiment, verifies that the virtual guest 120 is in direct communication with a processor 215 of the host computing system 105 independent of the virtual machine manager 110. In another embodiment, this means that the verification module 505 uses metrics from a Trusted Platform Module ("TPM") in communication with and/or residing in the host computing system 105. As known in the art, a TPM implements system security for a computing system according to specifications of the Trusted Computing Group ("TCG"). The TCG maintains Trusted Computing specifications that involve client-side system security. As is known in the art, trusting computing provides for data protection, platform recognition, authorization, and the like. The host computing system 105 may use the TPM to store signature and encryption keys and to measure computing system integrity. Specifically, the TPM may measure software and hardware integrity in host computing system 105 allowing a particular computing environment in the computing device to be recognizable by the verification module 505.

The TPM may measure integrity in a computing system, giving a particular operating environment 102 in a computing system a unique signature and allowing the particular operating environment 102 to be recognizable. To measure system integrity, the TPM typically obtains metrics of computing device characteristics at boot time and/or pre-boot time. These metrics may include measurements of executable code such as the BIOS, computing device firmware, the kernel, and the like. These metrics may also include measurements of hardware components. The TPM may store an indicator of these metrics, called a PCR digest value, in special registers called PCRs.

When a computing environment is not recognized because the integrity measurements of the TPM are not consistent with a recognized environment (e.g. the verification module 505 cannot verify that it is in direct communication with the host computing system processor 215), certain software may be restricted from operating in the unrecognized environment or access to certain data may be blocked.

In one embodiment, the TPM is a hardware chip, integrated circuit, or other physical component comprising hardware or hardware and software. In another embodiment, the TPM comprises executable software code stored on a computer readable storage medium. In another embodiment, a single hardware TPM may be virtualized to give each virtual machine access to a common TPM. This virtualized TPM ("vTPM") as is known in the art, allows multiple virtual guests 120 to use metrics from a single TPM hardware chip.

In one embodiment, the verification module 505 measures metrics of a vTPM against a predetermined signature (which would indicate that the verification module 505 is communicating directly with the processor 215 as opposed to a virtual machine manager 110 spoofing direct hardware communication). If the verification module 505 determines that the metrics match with the predetermined signature, the verification module 505 verifies that the virtual guest 120 is in direct communication with the processor 215. Otherwise, the verification module 505 fails to verify direct communication. In another embodiment, the verification module 505 triggers a warning message and/or ceases further initialization of the virtual guest 120.

The request sending module 510, in one embodiment, sends a request, from the virtual machine manager 110, to the virtual guest 120 (e.g. the request receiving module 515 below) to access at least a portion of the inaccessible run-time memory 210. In another embodiment, the request sending module 510 is part of and/or in communication with the virtual machine manager 110. The request sending module 510 may determine a need for additional access in response to one or more predetermined events such as detecting an application crash on a particular virtual guest 120, in response to a pending virtual guest migration from one location in storage and/or host computing system 105 to another, and/or the like.

The request receiving module 515, in one embodiment, receives a request, from the virtual machine manager 110, to access at least a portion of the inaccessible run-time memory 210. As described above, in certain embodiments, the virtual machine manager 110 may request additional access to virtual guest memory for memory dump data (e.g. in response to an application crash) and/or a request for a virtual guest migration. The request receiving module 515 may provide an interface through which the virtual machine manager 110 may request additional access. In another embodiment, the request receiving module 515 also accepts an indicator of the desired data, of the reason for the request, and/or the like. In another embodiment, the request receiving module 515 is in communication with and/or part of the virtual machine manager 110 and receives a command from the request sending module 510.

The determination module 520, in one embodiment, determines whether the request for additional access from the virtual machine manager 110 meets one or more predetermined criteria. In another embodiment, the one or more predetermined criteria include a request for memory dump data and/or a request for a virtual guest migration. In another embodiment, the determination module 520 determines whether the request meets the predetermined criteria based on an identifier received by the request receiving module 515 indicating the data desired for access and/or the reason for the request.

The access module 525, in one embodiment, grants or denies access of the at least a portion of the inaccessible run-time memory 210 to the virtual machine manager 110. Specifically, the access module 525 may grant access in response to the determination module 520 determining that the request meets the one or more predetermined criteria and may deny access in response to the determination module 520 determining that the request fails to meet the predetermined criteria.

The encryption module 530, in one embodiment, encrypts particular data of the inaccessible run-time memory 210 prior to the access module 525 granting access of the at least a portion of the inaccessible run-time memory 210 to the virtual machine manager 110. The encryption module 530 may encrypt sensitive data before the access module 525 grants access to preserve the integrity of the sensitive data. In another embodiment, the address ranges and/or identity of data in which the encryption module 530 is to encrypt is predetermined by the virtual guest 120 and/or user. For example, the virtual machine manager 110 may specify that data associated with a particular application is to be encrypted. The virtual machine manager 110 may request additional access to perform a virtual guest migration to a second host computing system 105 in response to storage on the first host computing system 105 reaching a predetermined threshold. The encryption module 530 may encrypt the data pertaining to the particular application and the access module 525 may grant access to the virtual machine manager 110. After the virtual guest migration is complete, the encryption module 530 may unencrypt the subject data. The encryption module 530 may use any suitable encryption algorithm to encrypt data of the allocated memory portion.

The detection module 535, in one embodiment, detects that the virtual guest 120 is unresponsive (e.g. the virtual guest 120 has crashed or is otherwise non-functioning). In another embodiment, the detection module 535 is in communication with and/or is part of the virtual machine manager 110. The detection module 535 may detect that the virtual guest 120 is unresponsive in response to the virtual guest 120 not responding for a predetermined period of time. Because the virtual machine manager 110 lacks access to the allocation of run-time memory 210, the virtual machine manager 110 cannot directly deallocate run-time memory 210 for the virtual guest 120.

Therefore, the destroying command module 540, in one embodiment, calls a predetermined command to destroy the allocation of run-time memory 210 for the virtual guest 120 without the virtual machine manager 110 accessing the allocation of run-time memory 210. Like the detection module 535, the destroying command module 540 may be in communication with and/or part of the virtual machine manager 110. The destroying command module 540 may call a predetermined command of the host computing system 105 to destroy run-time memory 210 associated with a particular virtual guest 120. The host computing system 105 destroys the allocation of run-time memory 210 in response to the destroying command module 540 calling the predetermined command. In another embodiment, the destroying command module 540 issues a command to destroy along with an identifier of the virtual guest 120 for which the run-time memory 210 is to be destroyed. In another embodiment, the identifier is a VPID for the virtual guest 120, as described above. For example, one non-limiting embodiment of the destroying command may be "VPID_DESTROY(vpid)," instructing the host computing system 105 to destroy (e.g. deallocate) run-time memory 210 associated with a virtual guest 120 having the VPID of the submitted parameter.

The destroying module 545, in one embodiment, receives a call, from the virtual machine manager 110, to a predetermined command to destroy the allocation of run-time memory 210 for the virtual guest 120. The destroying module 545, in another embodiment, destroys the allocation of run-time memory 210 in response to receiving call to the predetermined command. In another embodiment, the destroying module 545 is in communication with hardware of the host computing system 105 such as the processor 215 and may destroy (e.g. deallocate) run-time memory 210 associated with the virtual guest 120. As described above, the predetermined command may include a parameter to specify the VPID of the virtual guest 120 for which the run-time memory 210 is to be destroyed. The destroying module 545 may destroy data pages with the VPID passed in with the predetermined command, destroy the VPID execution context, and flushing the page table and extended page table entries for the particular VPID.

The association module 550, in one embodiment, associates one or more virtual guest identifiers with a particular run-time memory 210 page of the allocation of run-time memory 210. In another embodiment, at least one of the virtual guest identifiers identifies the virtual guest 120. In another embodiment, the association module 550 is in communication with the processor 215 of the host computing system 105 (e.g. in firmware associated with the processor 215).

The virtual guest identifier may comprise a VPID as described above, which uniquely identifies a data page of run-time memory 210 as being associated with a particular virtual guest 120. The association module 550 may receive a predetermined command from the protection module 415 as described above, and may associate one or more virtual guest identifiers with a particular run-time memory 210 page of the allocation of run-time memory 210. For example, the association module 550 may associate a virtual guest identifier with one or more data pages of the allocation of memory for the virtual guest 120 by setting the virtual guest's VPID for the data pages requested by the protection module 415. In one embodiment, the association module 550 also associates a VPID of the virtual machine manager 110 to data pages that the protection module 415 requested to be shared with the virtual machine manager 110. Therefore, certain data pages may include a VPID identifying the virtual guest 120 and identifying the virtual machine manager 110 as having access.

The access request module 555, in one embodiment, provides processor-level access protection to run-time data pages of the virtual guest 120. In another embodiment, the access request module 555 grants an access request to a particular run-time memory 210 data page from a requester in response to the requester having a corresponding virtual guest identifier for the particular run-time memory 210 page. Likewise, the access request module 555 denies an access request to the particular run-time memory 210 page from a requester in response to the requester lacking a corresponding virtual guest identifier for the particular run-time memory 210 page. In another embodiment, the access request checks a requester's VPID against the one or more VPIDs for a particular data page and grants access to the requester if the requester's VPID is associated with the particular data page. In yet another embodiment, the access request module 555 uses a bitmap that the access request module 555 checks against to determine a level of access to grant to a particular VPID (e.g. of a requester).

Figure 6:
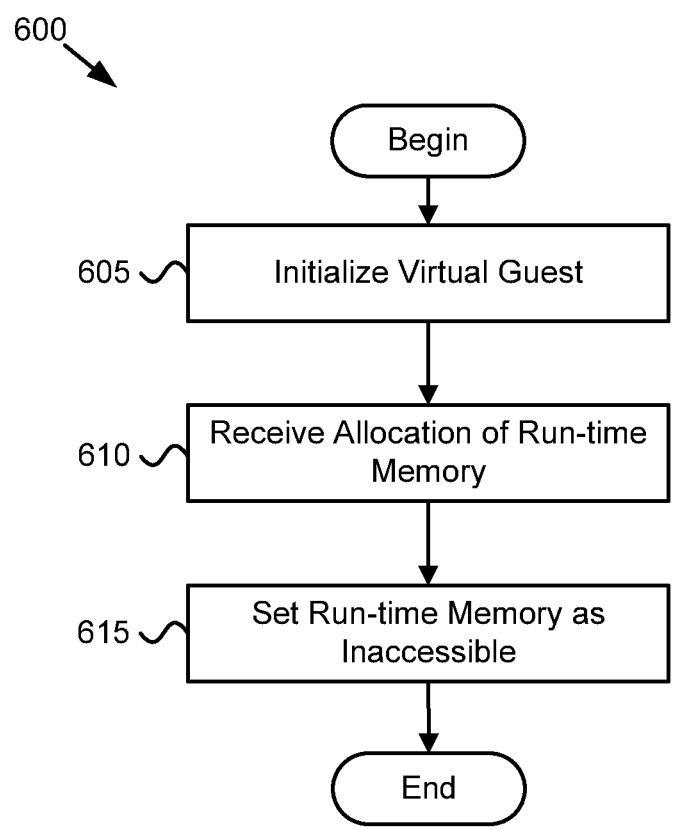
FIG. 6 is a schematic flow chart diagram illustrating one embodiment of a method for protecting virtual guest memory in accordance with the present invention.

FIG. 6 is a schematic flow chart diagram illustrating one embodiment of a method 600 for protecting virtual guest memory. The method 600 begins and the initialization module 405 initializes 605 a virtual guest 120 on a host computing system 105 that includes a virtual machine manager 110 such as a hypervisor. The virtual machine manager 110 manages operation of the virtual guest 120 and the virtual guest 120 includes a distinct operating environment executing in a virtual operation platform provided by the virtual machine manager 110.

The receiving module 410 receives 610 an allocation of run-time memory 210 for the virtual guest 120. The allocation of run-time memory 210 includes a portion of run-time memory 210 of the host computing system 105. The protection module 415 then sets 615, by the virtual guest 120, at least a portion of the allocation of run-time memory 210 to be inaccessible by the virtual machine manager 110. Then, the method 600 ends.

Figure 7:
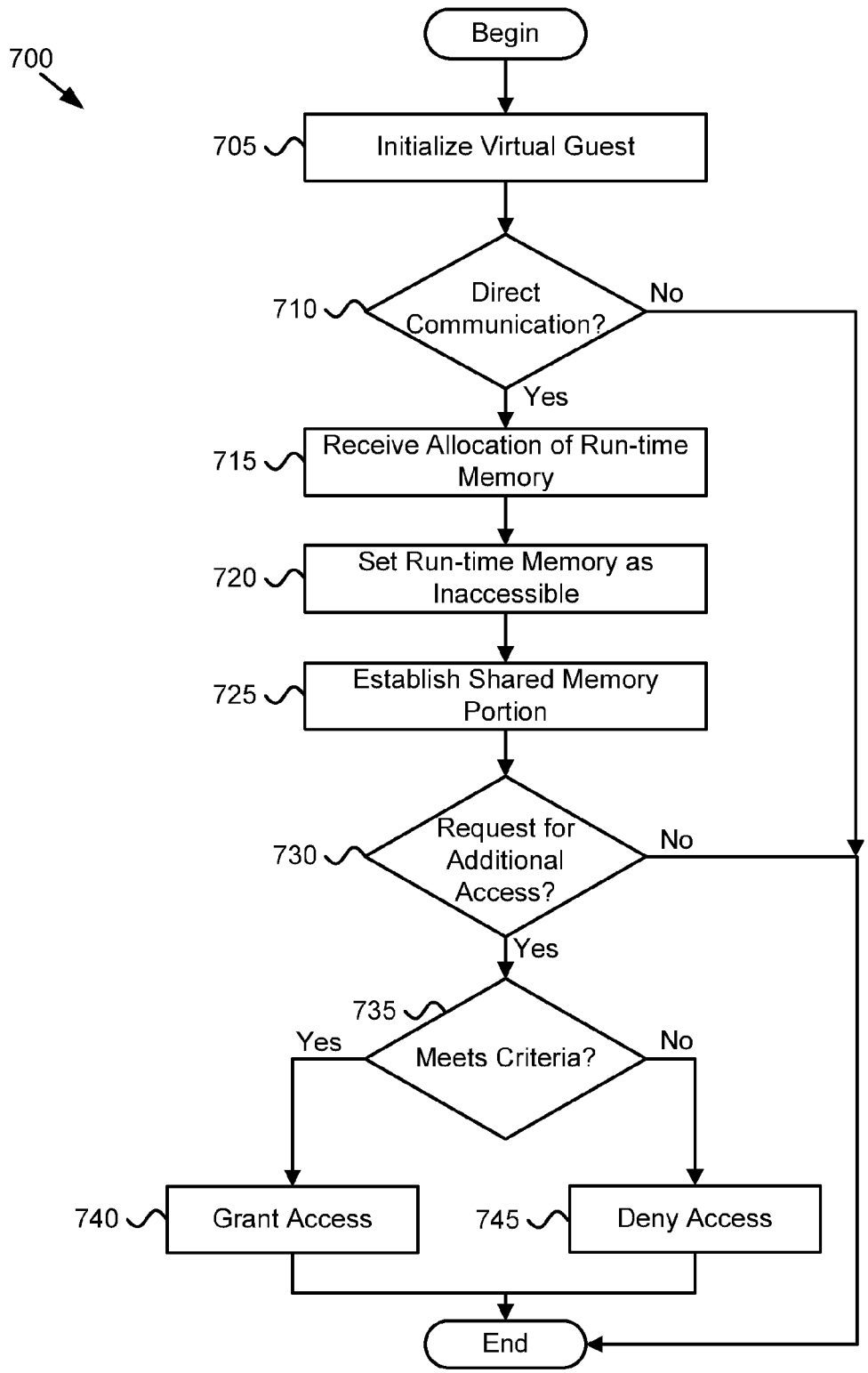
FIG. 7 is a schematic flow chart diagram illustrating another embodiment of a method for protecting virtual guest memory in accordance with the present invention.

FIG. 7 is a schematic flow chart diagram illustrating another embodiment of a method 700 for protecting virtual guest memory. The method 700 begins and the initialization module 405 initializes 705 a virtual guest 120 on a host computing system 105 that includes a virtual machine manager 110 such as a hypervisor. The verification module 505 verifies 710 that the virtual guest 120 is in direct communication with a processor 215 of the host computing system 105 independent of the virtual machine manager 110. For example, the verification module 505 may verify a recognized computing environment using a TPM. If the verification module 505 determines 710 that the virtual guest 120 is not in direct communication with the processor 215, the method 700 ends. If the verification module 505 determines 710 that the virtual guest 120 is in direct communication with the processor 215, the receiving module 410 receives 715 an allocation of run-time memory 210 for the virtual guest 120.

The protection module 415 then sets 720, by the virtual guest 120, at least a portion of the allocation of run-time memory 210 to be inaccessible by the virtual machine manager 110. In one embodiment, the virtual guest 120 sets the portion of the allocation of run-time memory 210 as inaccessible by communicating directly with a processor 215 of the host computing system 105 and calling predetermined commands. The association module 550 may associated data pages of the run-time memory 210 with a VPID of the virtual guest 120 in response to the virtual guest 120 calling the predetermined commands. Next, the protection module 415 establishes 725 a shared memory portion 315 for access by the virtual machine manager 110. The shared memory portion 315 includes a portion of the allocation of run-time memory 210 of the virtual guest 120 and the protection module 415 may establish the shared memory portion 315 by similar calling commands directly to the processor 215.

If the receiving module 410 does not receive 730 a request, from the virtual machine manager 110, to access the inaccessible run-time memory 210, the method 700 ends. If the receiving module 410 receives 730 a request, from the virtual machine manager 110, to access at least a portion of the inaccessible run-time memory 210, the determination module 520 determines 730 whether the request meets one or more predetermined criteria. If the determination module 520 determines 735 that the request meets the one or more predetermined criteria, the access module 525 grants 740 access of the portion of the inaccessible run-time memory 210 to the virtual machine manager 110. Otherwise, the access module 525 denies 745 access to the portion of the inaccessible run-time memory 210. Then, the method 700 ends.

Figure 8A:
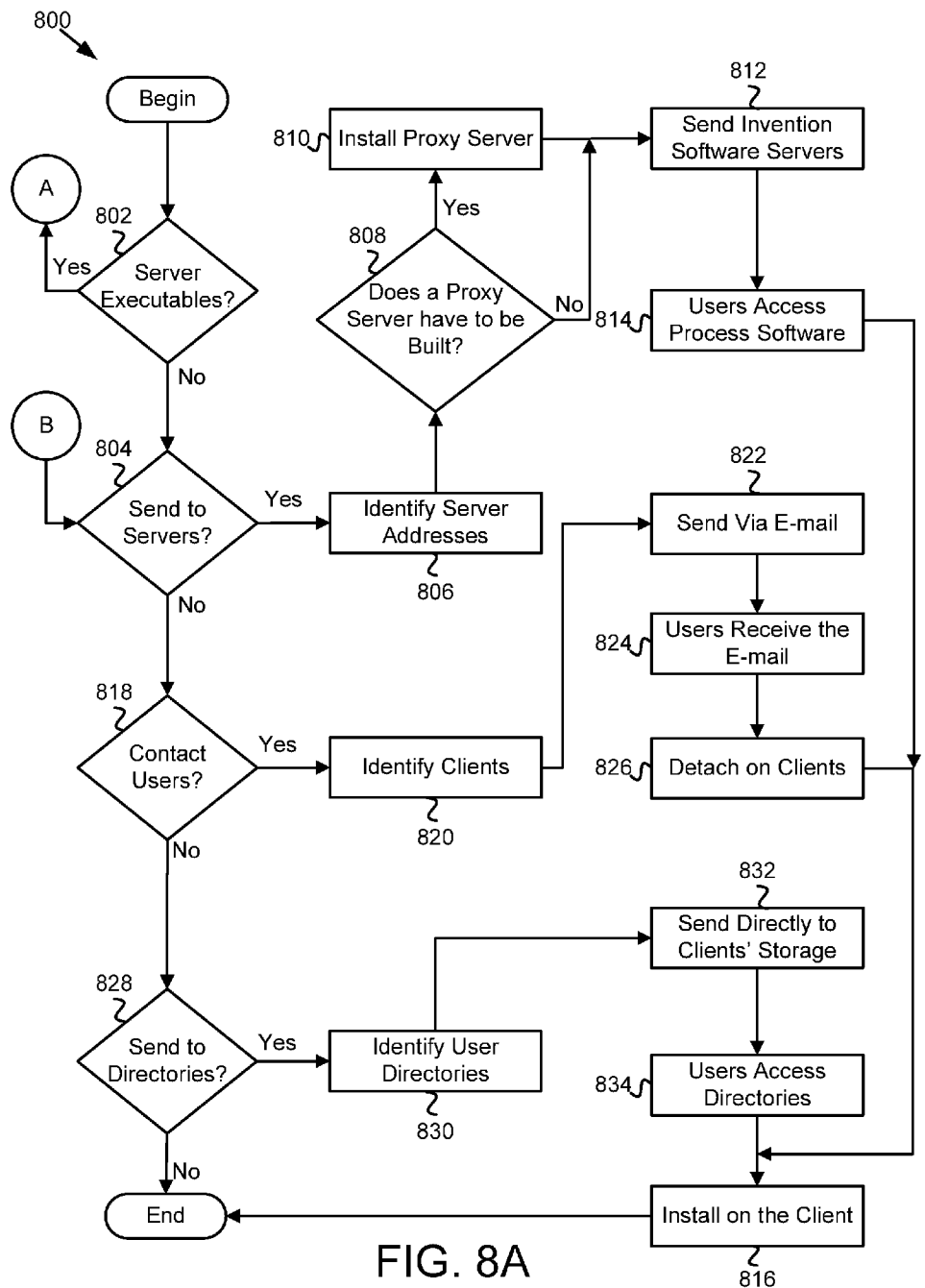
FIG. 8A is a schematic flow chart diagram illustrating one embodiment of a method for deploying a virtual guest security apparatus in accordance with the present invention.

FIG. 8A is a schematic flow chart diagram illustrating one embodiment of a method 800 for deploying a virtual guest memory apparatus 205. While it is understood that the process software embodying the virtual guest memory apparatus 205 may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software may be transmitted to the proxy server and then it may be stored on the proxy server.

Figure 8B:
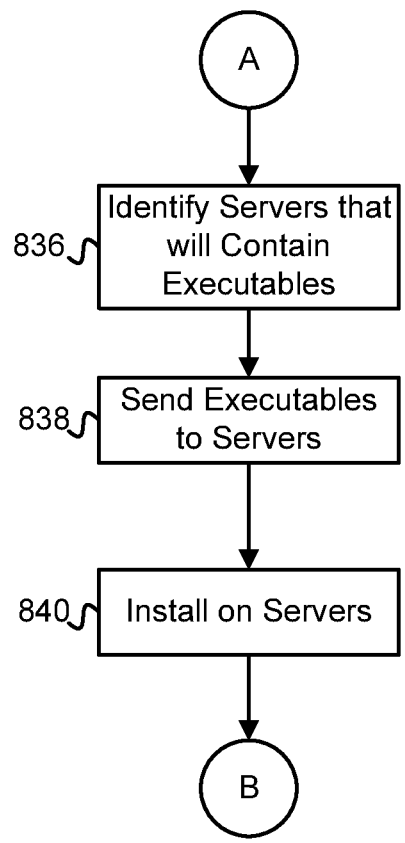
FIG. 8B is a continuation of FIG. 8A illustrating one embodiment of a method for deploying a virtual guest security apparatus in accordance with the present invention.

The method 800 for deployment of the process software begins and a determination 802 is made if there are any programs that will reside on a server or servers when the process software is executed. If this is the case, referring to FIG. 8B, the servers that will contain the executables are identified 836. The process software for the server or servers is transferred 838 directly to the servers' storage via FTP or some other protocol or by copying though the use of a shared file system. The process software is then installed 840 on the servers.

Next, referring back to FIG. 8A, a determination 804 is made on whether the process software is be deployed by having users access the process software on a server or servers. If the users are to access the process software on servers then the server addresses that will store the process software are identified 806. A determination 808 is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 810. The process software is sent 812 to the servers either via a protocol such as FTP or it is copied directly from the source files to the server files via file sharing. Another embodiment would be to send a transaction to the servers that contained the process software and have the server process the transaction, then receive and copy the process software to the server's file system. Once the process software is stored at the servers, the users, via their client computers, then access 814 the process software on the servers and copy to their client computers file systems. Another embodiment is to have the servers automatically copy the process software to each client and then run the installation program for the process software at each client computer. The user executes the program that installs 816 the process software on his client computer then the method 800 ends.

In step 818, a determination is made whether the process software is to be deployed by sending the process software to users via e-mail. The set of users where the process software will be deployed are identified 820 together with the addresses of the user client computers. The process software is sent via e-mail to each of the users' client computers. The users then receive the e-mail 824 and then detach 826 the process software from the e-mail to a directory on their client computers. The user executes the program that installs 816 the process software on his client computer then the method 800 ends.

Lastly a determination 828 is made on whether to the process software will be sent directly to user directories on their client computers. If so, the user directories are identified 830. The process software is transferred 832 directly to the user's client computer directory. This can be done in several ways such as but not limited to sharing of the file system directories and then copying from the sender's file system to the recipient user's file system or alternatively using a transfer protocol such as File Transfer Protocol (FTP). The users access 834 the directories on their client file systems in preparation for installing the process software. The user executes the program that installs the process software on his client computer 816 then the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an initialization module that initializes a virtual guest on a host computing system, the host computing system comprising a virtual machine manager, the virtual machine manager managing operation of the virtual guest, the virtual guest comprising a distinct operating environment executing in a virtual operation platform provided by the virtual machine manager;
a receiving module that receives an allocation of run-time memory for the virtual guest, the allocation of run-time memory comprising a portion of run-time memory of the host computing system; and
a protection module that sets, by the virtual guest, at least a portion of the allocation of run-time memory to be inaccessible by the virtual machine manager,
wherein the initiation module, the receiving module, and the protection module comprise one or more of hardware and executable code, the executable code stored on one or more computer readable storage media.

2. The apparatus of claim 1, wherein the protection module further establishes a shared memory portion for access by the virtual machine manager, the shared memory portion comprising a portion of the allocation of run-time memory of the virtual guest.

3. The apparatus of claim 1, further comprising a verification module that verifies that the virtual guest is in direct communication with a processor of the host computing system independent of the virtual machine manager.

4. The apparatus of claim 1, further comprising:
a request receiving module that receives a request, from the virtual machine manager, to access at least a portion of the inaccessible run-time memory;
a determination module determining that the request meets one or more predetermined criteria; and
an access module that grants access of the at least a portion of the inaccessible run-time memory to the virtual machine manager in response to determining that the request meets the one or more predetermined criteria.

5. The apparatus of claim 4, further comprising a destroying command module that calls a predetermined command to destroy the allocation of run-time memory for the virtual guest without the virtual machine manager accessing the allocation of run-time memory, the host computing system destroying the allocation of run-time memory in response to the destroying module calling the predetermined command.

6. A system comprising:
a virtual machine manager that provides a virtual operation platform for a host computing system;
a processor;
a memory storing modules for execution by the processor, the memory comprising:
an initialization module that initializes a virtual guest on the host computing system, the host computing system comprising the virtual machine manager, the virtual machine manager managing operation of the virtual guest, the virtual guest comprising a distinct operating environment executing in the virtual operation platform provided by the virtual machine manager;
a receiving module that receives an allocation of run-time memory for the virtual guest, the allocation of run-time memory comprising a portion of run-time memory of the host computing system; and
a protection module that sets, by the virtual guest, at least a portion of the allocation of run-time memory to be inaccessible by the virtual machine manager.

7. The system of claim 6, further comprising:
a detection module that detects that the virtual guest is unresponsive; and
a destroying command module that calls a predetermined command to destroy the allocation of run-time memory for the virtual guest, without the virtual machine manager accessing the allocation of run-time memory, in response to the detection module detecting that the virtual guest is unresponsive, the host computing system destroying the allocation of run-time memory in response to the destroying module calling the predetermined command.

8. The system of claim 6, further comprising:
an association module that associates one or more virtual guest identifiers with a particular run-time memory page of the allocation of run-time memory, at least one of the virtual guest identifiers identifying the virtual guest; and
an access request module that grants an access request to the particular run-time memory page from a requester in response to the requester having a corresponding virtual guest identifier for the particular run-time memory page.

9. The system of claim 6, further comprising:
a destroying module that receives a call, from the virtual machine manager, to a predetermined command to destroy the allocation of run-time memory for the virtual guest and destroys the allocation of run-time memory in response to receiving call to the predetermined command.

* * * * *